United States Patent [19]

Mobley et al.

[11] 4,156,241
[45] May 22, 1979

[54] SATELLITE TRACKING ANTENNA APPARATUS

[75] Inventors: Joseph G. Mobley, Tucker; Robert J. Wilson, Norcross, both of Ga.

[73] Assignee: Scientific-Atlanta, Inc., Atlanta, Ga.

[21] Appl. No.: 783,582

[22] Filed: Apr. 1, 1977

[51] Int. Cl.² .............................................. H04B 7/00
[52] U.S. Cl. ........................ 343/100 ST; 343/117 R; 318/649
[58] Field of Search .................. 343/100 ST, 100 AD, 343/117 R, 709, 765; 318/649

[56] References Cited

U.S. PATENT DOCUMENTS

| | | | |
|---|---|---|---|
| 3,305,868 | 2/1967 | Kikuo et al. | 343/117 R |
| 3,986,092 | 10/1976 | Tijsma et al. | 318/649 |

Primary Examiner—Theodore M. Blum
Attorney, Agent, or Firm—Martin LuKacher

[57] ABSTRACT

Satellite tracking apparatus for use on board ship as part of a maritime communications satellite terminal is disclosed. A directional antenna which is adapted to be trained in the direction of the satellite so as to be in communication therewith is mounted so as to be positioned about three axes, namely train, elevation, and cross-level axes. The mount also has a fourth axis which is parallel to or collinear with one of the other axes. This fourth axis may be a level axis which is movable with the antenna. A stable platform is movable with and rotatable about the level axis. Sensors on this platform provide outputs to servo controllers which rotate the antenna about the elevation and cross-level axes to maintain the platform stable. An azimuth sensor such as a gyro compass and sensors responsive to angular motion with respect to the train axis may also be mounted on the platform and provide outputs to a servo controller which controls the bearing or azimuth position of the antenna. An open loop control is provided for the level axis which establishes an equivalent angle between the stable platform and the true elevation line of sight (an angle equal to but opposite from the true elevation angle to the satellite). A mislevel is thereby created and sensed by the sensor for the elevation axis which provides an output that activates the elevation axis servo controller to reduce the mislevel to zero and null, thereby achieving the desired elevation of the antenna. The antenna is stabilized and decoupled from the motions (roll, pitch and yaw) of the ship and changes in the ship's heading, in that the sensors are mounted on the stable platform which moves with the antenna. The need for coordinate conversion computers responsive to sensors strapped down to the deck or other ship structure and for alignment of the antenna axes with the pitch or roll axis of the ship is also eliminated. The rotation of the antenna about its boresight axis is eliminated; thus avoiding misalignment between the polarization of the antenna and the satellite signals.

17 Claims, 6 Drawing Figures

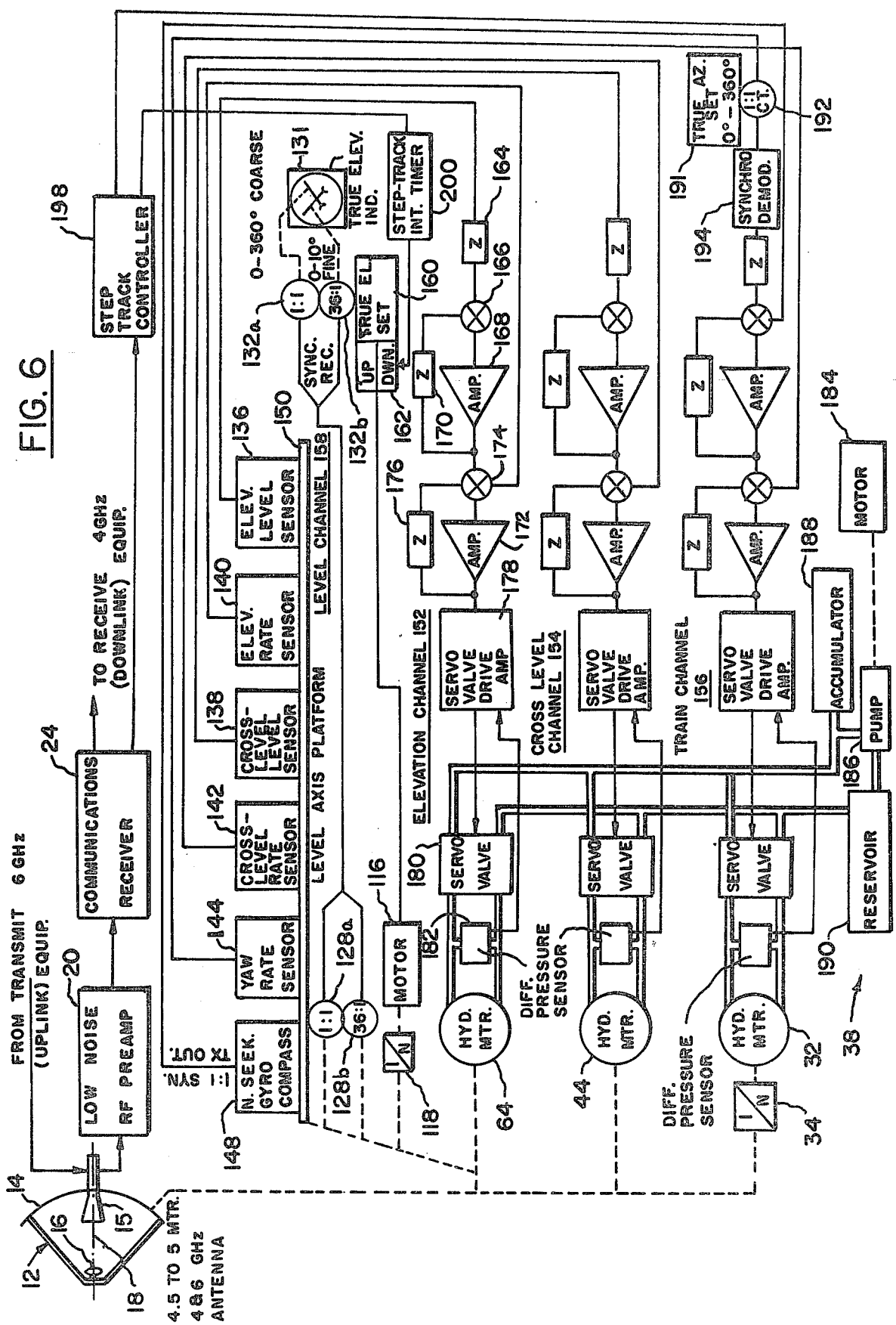

SATELLITE TRACKING ANTENNA APPARATUS

The present invention relates to satellite tracking antenna apparatus, and particularly to a maritime satellite tracking antenna system for providing communications via a satellite.

The invention is especially suitable for use in providing stabilized shipboard antenna apparatus utilizing large antennas (e.g., having reflectors or dishes of large diameters, say of 4.5 meters) which are adapted to track satellites in synchronous earth orbit, despite motions of the ship, to provide communication via the satellite. The apparatus provided by the invention may also be used for controlling and stabilizing the position of other bodies which are mounted on other carriers, such for example as optical systems or sensors which are carried by aircraft or land vehicles.

Antenna tracking systems which have heretofore been proposed for shipboard applications have involved mounts or pedestals which enable the antenna to be tilted about three mutually orthogonal axes so as to train the antenna and stabilize the antenna for the pitch, roll and yaw motion of the ship. In order to obtain signals for stabilizing the antenna, a vertical reference sensor, such as may include one or more gyros, is needed to measure the deck tilt due to pitch and roll. In addition, other deck mounted detectors such as gyro compasses and gyro rate sensors are needed to provide deck heading and yaw information. The values of the angles necessary to train the antenna about each of the axes (called the train orders) are complex trigonometric functions of the pitch and roll angles of the deck as well as of the heading of the ship. Accordingly, a coordinate conversion computer is required to generate the command signals which rotate the antenna about each of the axes so as to train the antenna on a target. The antenna is trained on the target when the boresight axis of the antenna is pointed at the target within a tolerance or pointing error such that the target is within the antenna beam. The axis of the antenna mount or pedestal must also be aligned with the vertical with respect to the deck and the roll and pitch axes of the deck in order to avoid errors in the computation of the train order command signals. Accordingly, a three axes antenna pedestal must be carefully aligned when installed on the ship. Inasmuch as the sensors are mounted or "strapped down" to the deck to sense the motion of the deck, these sensors are also responsive to structural flexing and vibration of the deck such that training errors are unavoidable. These errors are a function of the distance between the deck motion sensors and the pedestal such that the design of the antenna installation is constrained and limited to locations where the sensors and the pedestal are in close proximity in order to minimize the training errors.

Other antenna pedestals have used inertially stable platforms on which the antenna is mounted for rotation in elevation and azimuth. Such stable base pedestals require four axes, each of which must be capable of supporting the entire weight of the antenna. Accordingly, these pedestals present difficulty in design and are usually expensive.

Reference may be had to the text "Radar Scanners and Radomes" by W. M. Cady et al, Vol. 26, of the Massachusetts Institute of Technology Radiation Laboratory Series, McGraw-Hill Book Company, Inc., 1948, Chapter 4 thereof, for further information respecting stabilized antenna mounts and pedestals of the type discussed above. Satellite tracking antenna apparatus utilizing a stable platform mount is described in U.S. Pat. No. 3,999,184, issued to LeRoy Fuss, III, on Dec. 21, 1976, and in patent application Ser. No. 598,492 filed July 23, 1975 in the name of Joseph Graham Mobley, now U.S. Pat. No. 4,035,805.

It is a feature of this invention to provide a stabilized pedestal or mount especially adapted for use in a shipboard satellite communications terminal, whereby an antenna may be trained such that its boresight axis is kept pointing to the satellite in spite of the motion of the ship at sea. The antenna mount is stabilized without the need for a separate stable platform nor does the mount require the use of a coordinate conversion computer to obtain stabilization and train orders or commands.

It is a further feature of the invention that the antenna mount may be installed in almost any location, whether on the deck or in the superstructure, without the need for precision alignment of the mount with respect to the vertical or to the axis of the motion of the ship.

It is a further feature of the invention to eliminate rotation of the antenna about its boresight axis. This avoids misalignment between the polarization of the antenna and the satellite signals. Consequently, reduction in power of signals as received, either at the antenna or at the satellite, due to polarization misalignment is avoided. This is particularly significant in frequency reuse applications, where receive and transmit signals use the same frequency but have orthogonal polarizations, since any polarization misalignment would result in significant cross-talk.

Accordingly, it is a principal object of the invention to provide improved apparatus for maintaining the boresight axis of a shipborne antenna pointing to a satellite in earth synchronous orbit so as to provide reliable communications via the satellite.

It is another object of the invention to provide an improved shipboard antenna tracking system which can be stabilized for motion of a ship at sea.

It is a further object of the present invention to provide an improved shipboard satellite antenna tracking system wherein the antenna is decoupled from the roll, pitch, heading change, and yaw motions of the ship.

It is a still further object of the present invention to provide an improved shipboard antenna tracking system stabilized for motion of a ship at sea in which sensors strapped down to the deck, coordinate conversion computers, and accurate alignment with respect to the deck are unnecessary.

It is a still further object of the invention to provide an improved shipboard antenna tracking system which is especially adapted for handling large antennas (e.g., antennas having dishes of the order of 4.5 meters in diameter).

It is a still further object of the present invention to provide an improved shipboard satellite antenna tracking system which is capable of accommodating large antennas and is suitable for use under the environmental conditions encountered in a ship at sea.

It is a still further object of the invention to provide an improved satellite antenna tracking system in which polarization misalignment is avoided through the use of an inertially stabilized antenna.

It is a still further object of the present invention to provide apparatus for controlling the position of a body such that it remains substantially stable with respect to a plurality of inertial coordinates.

It is a still further object of the invention to provide improved apparatus for controlling the position of a body so that the position thereof remains stable with respect to a plurality of inertial coordinates notwithstanding that the body is carried on a vehicle which is subject to motion with respect to such coordinates.

Briefly described, the invention when embodied in satellite tracking antenna apparatus makes use of an antenna mount which is capable of rotating the antenna about a plurality of mutually orthogonal axes, about each of which the antenna is rotatable. These axes may be defined as the train axis, the cross-level axis, and the elevation axis. The train axis for the shipborne antenna is an axis substantially normal to the deck of the ship. A first part of the antenna mount is in the form of a section which is rotatable with respect to the deck of the ship about the train axis. The cross-level axis is orthogonal to the train axis. A second part of the antenna mount, which is rotatable about the cross-level axis, is rotatably attached to the section of the mount which rotates about the train axis. The elevation axis is orthogonal to the cross-level axis. The antenna may be attached to a third part of the mount which rotates about the elevation axis. This third part is rotatably attached to the second part of the mount. Rotatable with the antenna is a unit which may be attached to the third part of the mount. This unit is rotatable about a level axis, which is an axis parallel to or collinear with the elevation axis. This unit defines a platform for a plurality of sensors. These sensors detect the position, and may also detect the angular motion, of the antenna about the elevation and cross-level axes. An azimuth sensor, such as a gyro compass, may be mounted on the platform and detects the relative bearing of the platform, and thus of the antenna boresight axis, with respect to a reference direction (e.g., North). The mount is provided with servo control means responsive to the sensors which rotate the antenna about the elevation and cross-level axes to maintain the antenna and the platform level. The azimuth sensor provides an output, which may be combined with a command signal corresponding to the desired azimuth direction of the boresight axis of the antenna, which is applied to the servo control means for rotating the antenna about the train axis to set the boresight axis of the antenna at any desired azimuth position. An open loop control channel is provided for rotating the level platform about the level axis so as to vary the relative angular displacement of the level axis with respect to the elevation axis. The elevation sensor then detects the mislevel and operates the servo control means to rotate the antenna about the elevation axis so as to change the attitude thereof in elevation to correspond to the relative angle. The antenna elevation position is thereby set. Inasmuch as the sensors are located on the stable platform, they are decoupled from the motion of the ship. This permits the antenna to be mounted at almost any arbitrary position on the ship, whether on the deck or the superstructure. It is desirable however, in the interest of ease of implementation, to locate the antenna near the ships center of gyration, say a distance of less than 100 feet from the center of gyration. Since the sensing is accomplished within the mount for the antenna, no strapped-down deck motion sensing means is required. Neither is a coordinate conversion computer required to generate the signals for stabilizing the antenna. The apparatus is also substantially immune to pointing errors due to structural deflections and vibration of the deck. A separate stable platform is not required. The weight of the antenna need only be carried along three axes.

The foregoing and other objects, advantages and features of the present invention will become more apparent from a reading of the following description of the preferred embodiment of the invention which is set forth herinafter and is shown in the accompanying drawings in which:

FIG. 6 is a simplified block diagram schematically showing the sensors and servo control system of satellite antenna tracking apparatus embodying the invention.

Figure 1:
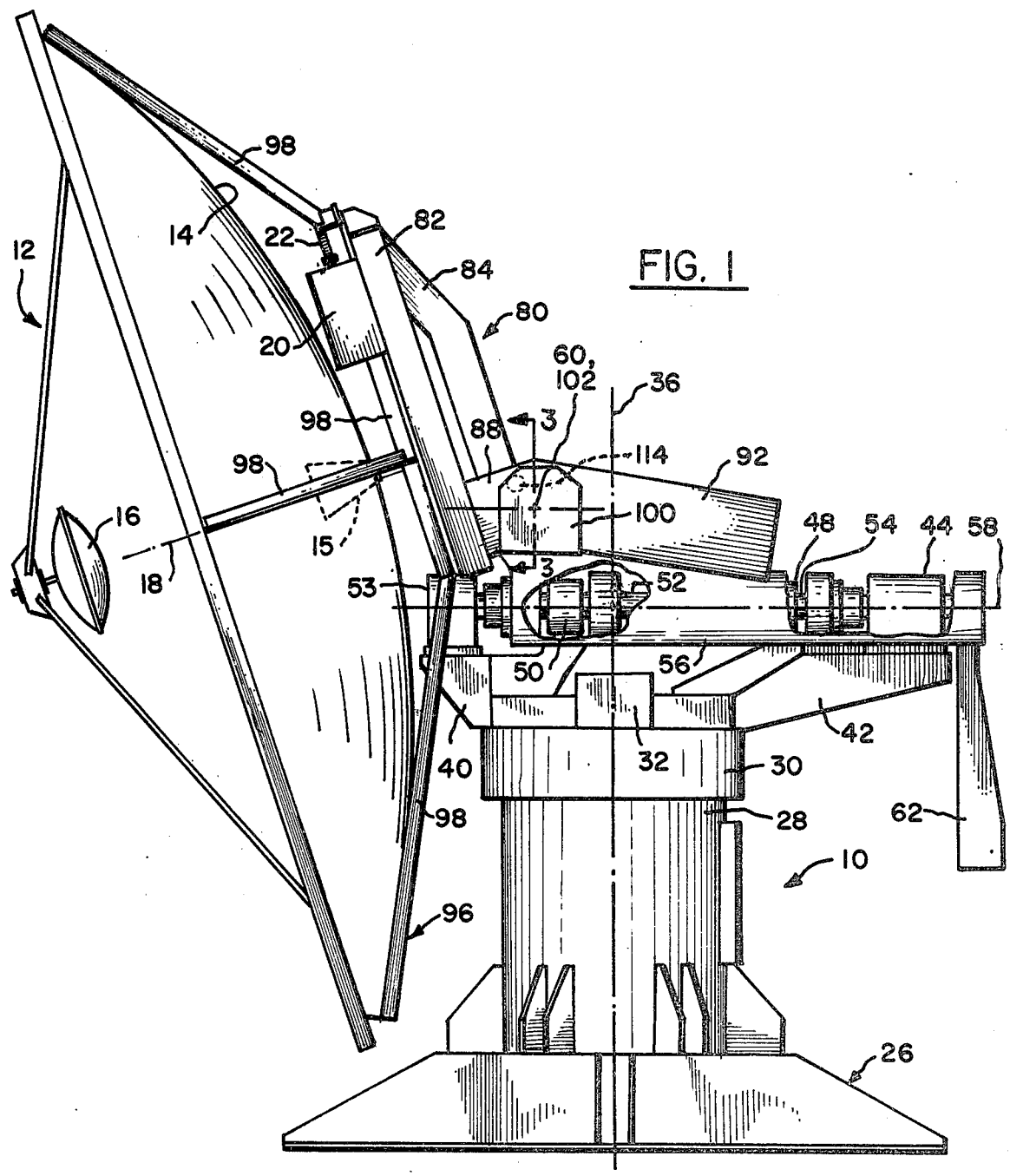
FIG. 1 is a view from one side of an antenna structure for maritime satellite tracking antenna apparatus which embodies the invention.
Figure 2:
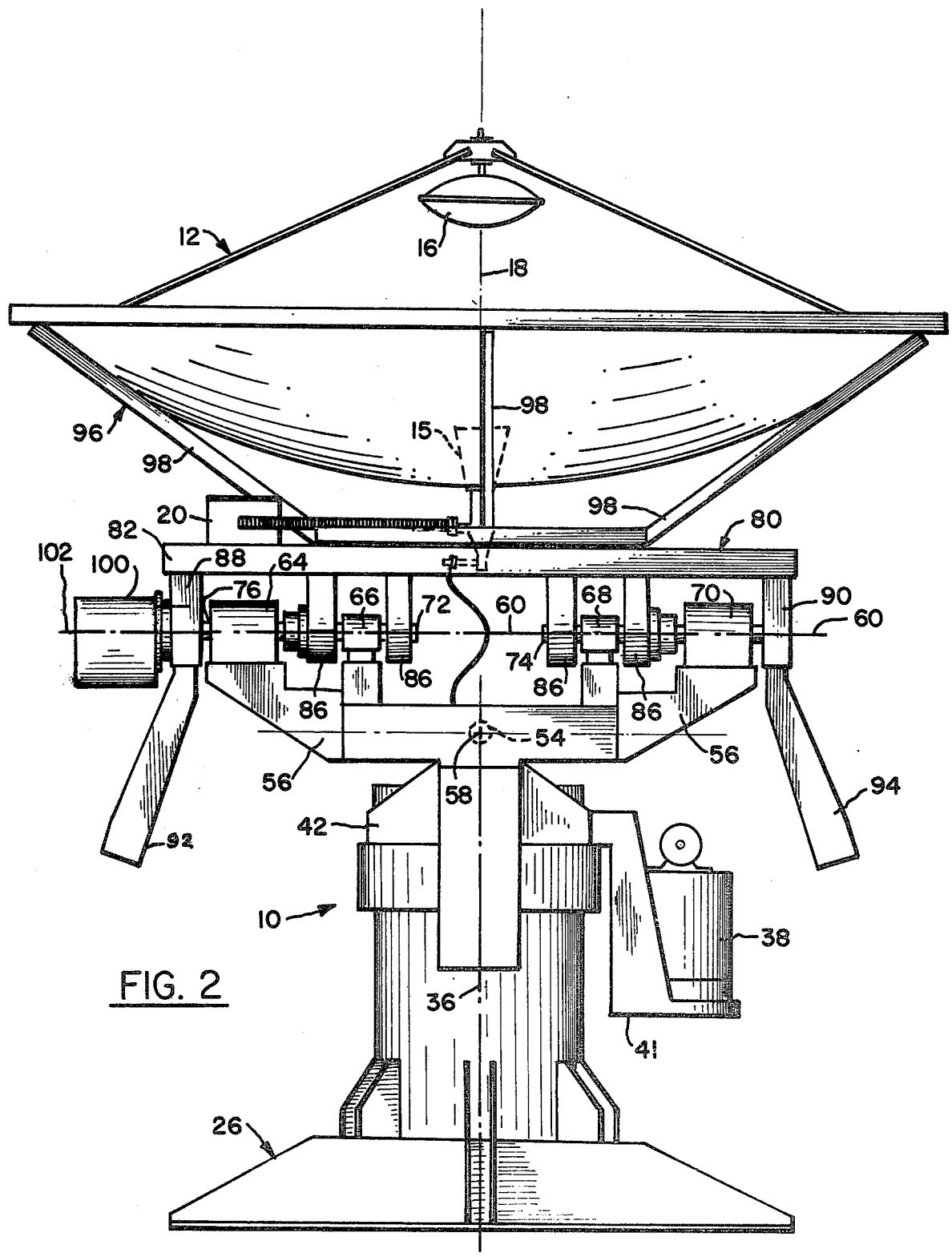
FIG. 2 is a view from the rear of the antenna structure shown in FIG. 1 with the dish of the antenna in a position different from the position of the dish as shown in FIG. 1.

Referring more particularly to FIGS. 1 and 2, there is shown an antenna mount pedestal 10. An antenna 12 on the pedestals includes a dish or reflector 14, a Cassegrain feed 15, and a sub-reflector 16. The dish 14 of the antenna may for example be parabolic in shape and have a diameter of 4.5 meters. The antenna has a boresight axis 18 which extends through the center of the dish 14 and of the feed 15 and sub-reflector 16. The apparatus provided by the invention trains the antenna so that the boresight axis 18 points to a satellite in earth synchronous orbit with which communication is to be maintained. The pointing error or accuracy is such that the beam of the antenna directional pattern contains the satellite. For a large antenna as herein illustrated, a pointing error within ±0.5° RMS may be suitable. The feed is connected to a low-noise amplifier 20 by way of a wave guide 22; a portion of which is shown. The low-noise amplifier is connected through cables to a communications receiver 24 (see FIG. 6) which provides signals which are communicated via the satellite. These signals may be in the form of data messages or other information and may also be used for the control of the pointing of the antenna in the step track mode, as will be described hereinafter. Cables and wave guides (not shown) are connected to the feed 15 so as to transmit signals by way of the antenna 12 to the satellite. In this way shore-to-ship or ship-to-shore communications can be maintained.

The antenna pedestal is adapted to be mounted on the deck or superstructure of a ship, such as a drilling vessel which has equipment for drilling for oil or gas at sea. A platform 26 is secured to the deck or superstructure of the ship. A section 28 having a rotating turntable 30 is mounted on the platform 26. A motor 32 which is mounted on the turntable 30 drives the turntable through a reducing gear arrangement 34. (See FIG. 6) This reducing gear arrangement may be a ring or bull gear attached to the part of the section 28 which is secured to the platform 26 and a pinion gear coupled to the shaft of the motor 32. As the motor turns, the turntable 30 will rotate. This rotation is about a train axis 36 and may have a travel of ±360° about the train axis (viz, either a complete clockwise or counterclockwise rotation). The train axis is normal to the deck of the ship. The motor 32 is suitably a hydraulic motor which is operated by pressurized hydraulic fluid from a hydraulic power supply 38. The power supply 38 is carried on a bracket 41 which rotates with the turntable 30.

Arms 40 and 42 which are located diametrically opposite to each other on the turntable 30 carry a motor 44 and bearings 48 and 50. Another bearing 53 or an auxiliary motor may be mounted on the arm 40. A shaft having two parts 52 and 54 is mounted in the bearings 48 and 50. The shaft of the motor 44 is connected to the shaft part 54. The shaft parts are connected, as by being keyed, to a yoke 56 which is rotatable about the cross-level axis 58. The axes of the shaft parts 52 and 54 is collinear with the cross-level axis. The cross-level axis may also be called the cross-elevation axis, inasmuch as it is orthogonal with the elevation axis 60 which is located above the cross-level axis 58. The motor 44 is adapted to drive the yoke 56 about the cross-level axis so that the yoke may tilt in opposite senses with respect to the train axis. In order to accommodate for the motion of the ship, an angle of tilt of ±18° will be suitable. The motor 44 may also be a hydraulic motor which is operated by pressurized fluid from the hydraulic power supply 38. The yoke also has a counter-weight arm 62 attached to the rear thereof.

The yoke supports a motor 64 and bearings 66 and 68. Another bearing or an auxiliary motor 70 is also supported on the yoke. A shaft having two parts 72 and 74 is journaled in the bearings 66 and 68. The shaft Part 72 is coupled to the shaft of the motor 64. An extension 76 of the shaft 72 from the motor extends outward beyond the yoke 56. The axis of the shaft (formed by the parts 72 and 74) and the shaft extension 76 is collinear with the elevation axis 60. The shafts are attached as by being keyed to a support structure 80 for the antenna 12, such that the antenna 12 is rotatable about the elevation axis 60. The elevation axis travel extends from −18° to +108° referenced to a line perpendicular to the train axis 36 (i.e., 126° total travel), which is suitable for satellite tracking purposes under normal deck motion and for sky coverage from the horizon to the zenith (0°–90°) without mechanical interference.

The support structure 80 is an assembly having a base plate 82, which is strengthened by cross members 84. Extensions 86 of these cross members are attached to the shaft parts 72 and 74. End blocks 88 and 90 have counter-weight arms 92 and 94 extending therefrom. The shaft part 72 may be keyed to the block 88 and the shaft extension 76 may be keyed to the block 88 (see also FIG. 3).

A framework 96 of struts 98 cradles the dish 14. The low noise amplifier 20 is also supported on the plate 82 together with the wave guides which are connected thereto. The antenna 12 is therefore attached to the support structure 80 and is rotatable therewith about the mutually orthogonal elevation axis 60, cross-level axis 58 and train axis 36.

A housing 100 is mounted on the block 88 and thus is movable with the antenna 12 and its support structure 80. The housing is rotatable about a level axis 102 which is collinear with the elevation axis. It will be appreciated as the description proceeds that the level axis 102 may also be parallel to the elevation axis. Accordingly, the term "level axis" should be taken to connote an axis either parallel to or collinear with the elevation axis.

The housing 100 contains level and rate sensors which sense position and the angular motion of the antenna about the elevation and cross-level axes 60 and 58. An azimuth sensor, suitably a gyro compass, and a yaw rate sensor, may also be located within the housing 100 so as to sense the position of the antenna 12 and its angular motion with respect to the train axis 36. The housing 100 thus provides a unit within which there is defined a platform on which the sensors are effectively disposed. This platform is rotatable with the antenna 12 with respect to the train axis 36, the cross-level axis 58 and the elevation axis 60, besides being rotatable independently of the antenna about the level axis 102. The elevation and cross-level sensors of the unit provide information for holding the platform level. Thus the platform may be referred to as a level or stable platform.

Figure 3:
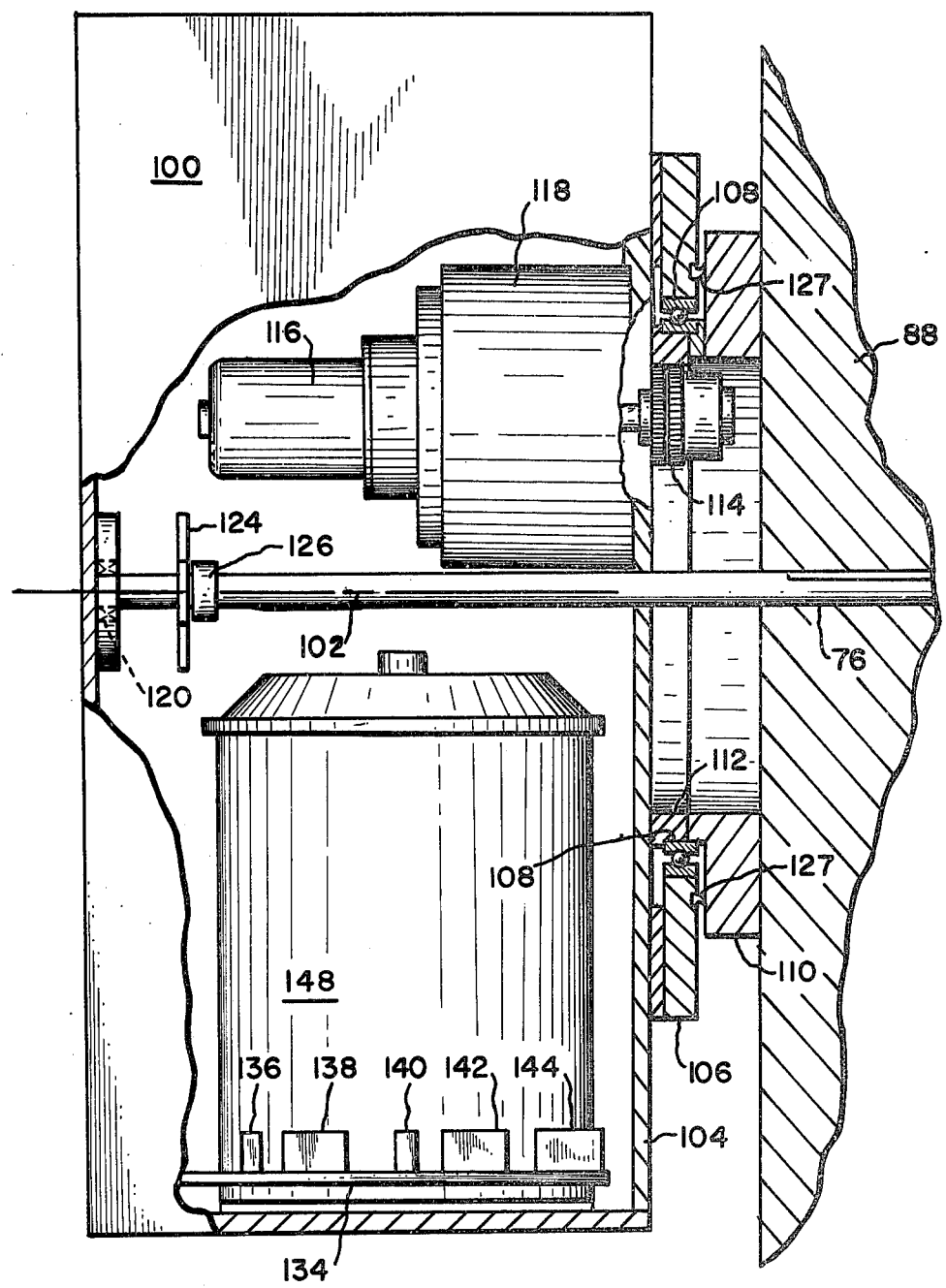
FIG. 3 is a sectional view of the unit which houses and defines a level platform for the sensors, which unit is rotatable about the level axis, the section being taken along the line 3—3 in FIG. 1.
Figure 4:
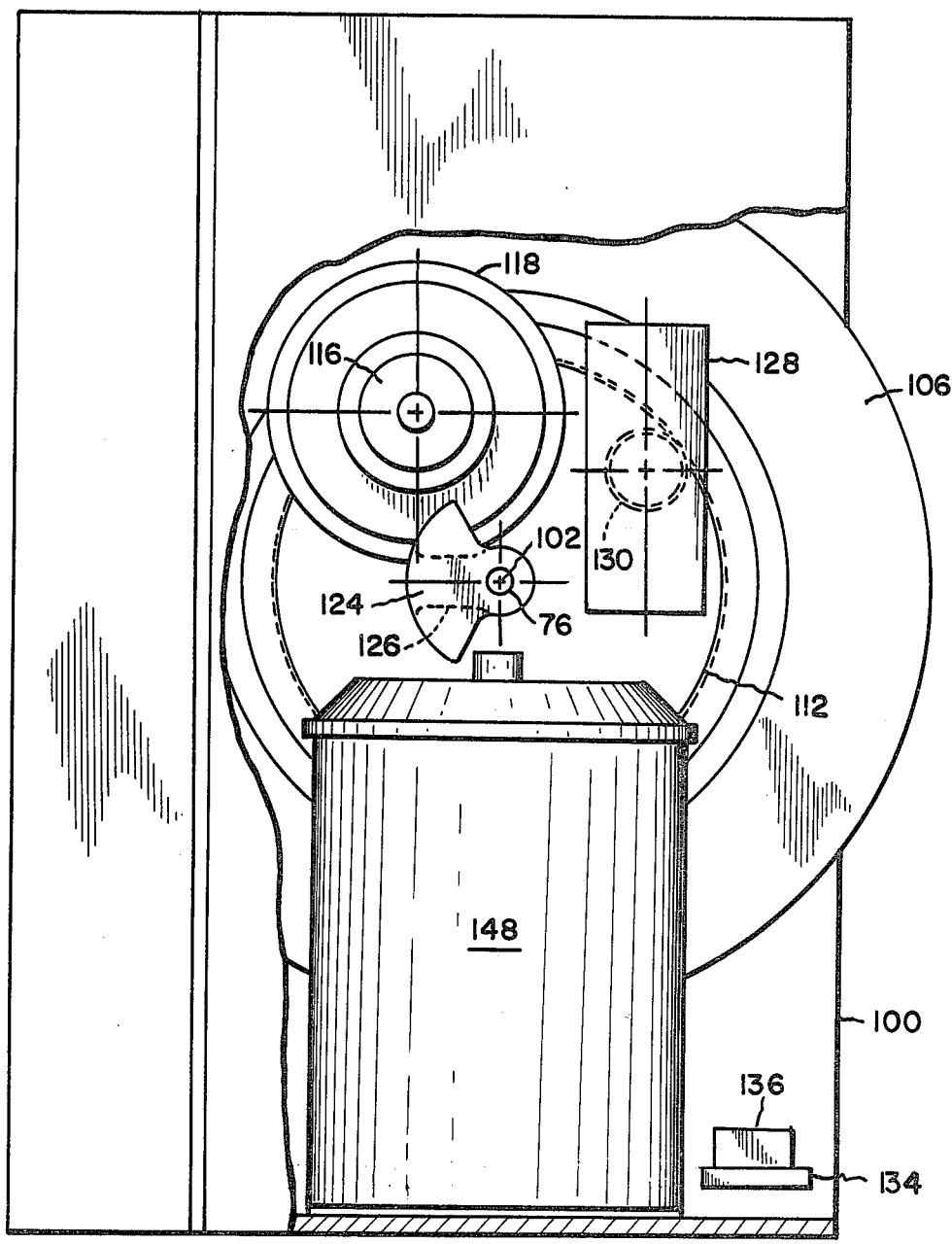
FIG. 4 is an end view of the unit as shown in FIG. 3.

The level axis unit which is contained in the housing 100 is shown in greater detail in FIGS. 3 and 4. Attached to the wall 104 of the housing 100 which is closest to the block 88 of the antenna support structure 80 is a plate 106 having a circular opening in which a gear bearing assembly 108 is located. The inner ball race of the gear bearing assembly 108 is attached to a stepped cylindrical member 110. The member 110 is attached, as by being bolted, to the block 88. The member 110 has an opening concentric with the collinear elevation axis 60 and level axis 102. The inner race of the gear bearing 108 is an internally cut bull or ring gear 112 and is attached to the member 110. A pinion gear 114 (suitably an anti-backlash gear) is disposed in driving relationship with the ring gear 112. This pinion gear 114 is driven by a level axis drive motor 116 through a gear reducer unit 118. The shaft extension 76 is supported at the outside wall of the housing 100 by means of a bearing 120. The bearing 120 is attached to the rear wall of the housing 100. Accordingly, the pinion 114 travels in a planetary fashion about the shaft extension 76; and thus rotates the entire housing about the level axis 102. The relative rotation (measured against the elevation axis) may suitably be from 0° to +90° so as to enable the antenna to be positioned from horizon to zenith. The shaft 76 may carry cams 124 and 126 which operate switches when the limits of rotation are reached. These switches may be used to limit or stop the rotation of the motor 116 and to actuate lights or other indicators which provide warning that the limit has been reached. Automatic backout from the limit is desirable and is accomplished by reversing the polarity of the current to the motor 116.

In order to seal the housing against wind or precipitation a weather seal or gasket 127 is attached to the front wall of the ring member 106. The gasket 127 may be a circular gasket which wipes against the face of the stepped member 110, thereby sealing the housing.

In order to measure and indicate the angular displacement of the level axis housing 100 relative to end block 88, synchro transmitters 128, which are attached to the front wall 104 of the housing are geared to the ring gear 112. A pinion or a spur gear 130 may be used for this purpose. In effect, therefore, the synchro transmitters measure the angular position of the level axis with respect to the elevation axis. This angular difference equals the elevation of the antenna (viz, the angular position of its boresight axis 18 in elevation). As shown in FIG. 6, a pair of synchro transmitters 128a and 128b may be provided which have one-to-one and 36-to-one reduction ratio. An elevation indicator dial 131 is operated by a pair of synchro receivers 132a and 132b and provide coarse and fine indications of the elevation of the antenna in degrees and in tenths of a degree, respectively.

A bracket 134 provides a table on which there is mounted an elevation level sensor 136, a cross-level level sensor 138, an elevation rate sensor 140, a cross-level rate sensor 142, and a yaw rate sensor 144. The long-term motion of the level axis platform 150 (FIG. 6) which is effectively defined in the level axis unit contained in the housing 100, is detected by the level sensors 136 and 138. The elevation level sensor 136 senses the angular position of the platform 150 relative to a local vector in the direction of the elevation line of sight. The cross-level sensor senses the angular position of the platform 150 relative to local vector about the cross-level axis when that vector is horizontal and in the same plane as the above-mentioned local vector about the elevation axis.

These position sensors may be devices such as transducers which have their sensitive axes parallel to the elevation axis in the case of the elevation level sensor 136, and parallel to the cross-level axis in the case of the cross-level level sensor 138. By sensitive axis is meant the axis of rotation about which an error signal is produced when the sensor rotates about that axis. Suitable transducers may be obtained from the Columbia Research Labs., Inc., of Woodlyn, Pa. 19094, their Model No. 701. The rate sensors are transducers which monitor the short-term motion of the platform 150 so as to be responsive to the angular motion thereof. The elevation rate sensor 140 has its sensitive axis parallel to the elevation axis while the cross-level rate sensor 142 has its sensitive axis parallel to the cross-level axis. Transducers suitable for use as the rate sensors 140 and 142 may be obtained from Honeywell Inc., Minneapolis, Minn., their Model No. GG 2500LC. The yaw rate sensor 144 may be a rate sensor similar to those used for the elevation and cross-level rate sensors 140 and 142 or it may be a fluid rate sensor which has its fluid path perpendicular to the train axis. Suitable fluid rate sensors may be of the type described in U.S. Pat. No. 3,500,691, and may be procured from Humphreys Inc., of San Diego, Calif. 92123.

An azimuth sensor, as may be provided by a gyro compass 148, is disposed in the housing 100 effectively on the level axis platform 150, and provides outputs corresponding to the bearing or azimuth position relative to a reference direction. The Mark 37 gyro compass (sold by Sperry Rand Corp., Great Neck, N. York, 11020) which is a North-seeking gyro compass and provides outputs relative to North (0° being North) is suitable.

All of the sensors 136, 138, 140, 142, 144 and 148 are mounted on the level platform and thus are rotatable with the antenna. Since the level platform is stabilized in the operation of the apparatus, the level platform is decoupled from the ship. The sensors are however responsive to the position and motion of the antenna notwithstanding that the motions may be pitch, roll, or any arbitrary vector sum of such motions. Accordingly, there is no need to accurately align the axes of the mount with the roll and pitch axes of the ship, nor are the sensors, by virtue of their being decoupled from the ship, subject to errors due to structural deflection or vibration of the ship.

The sensors provide outputs which stabilize the platform 150 and set the elevation and azimuth positions of the antenna boresight axis 18 by means of servo control.

The servo control system for the antenna is shown in FIG. 6. An elevation channel 152, a cross-level channel 154, and a train channel 156 provide servo control means for rotating the antenna 12 about the elevation, cross-level and train axes. Signals from the elevation sensors 136 and 140 are fed back through the elevation channel 152 to the elevation motor 64 to keep the level axis platform 150 stable and level about the elevation axis. Similarly, the signals are fed back from the cross-level sensors 138 and 142 through the cross-level channel 154 to drive the cross-level motor 44 so as to keep the platform 150 level and stable about the cross-level axis. The signals from the gyro compass 148 and the yaw rate sensor 144 are combined with an offset signal and fed back through the train channel 156 to the train motor 32 so as to maintain the antenna and the level axis in the desired azimuth position. Accordingly, the platform 150 is held motionless in inertial space. It will be noted that since the level axis is parallel to the antenna elevation axis, the azimuth angle of the level axis and the level platform are the same as the azimuth angle of the elevation axis (and perpendicular to the antenna boresight axis 18), such that the antenna is held stable at the set azimuth angle by servo control in response to feedback from the gyro compass 148 and the yaw rate sensor 144.

A level channel 158 provides open loop control for the level axis motor 116. The level axis motor 116 may be a direct current motor which applies motor drive current through an elevation set control 160. The direction of this current determines the direction of rotation of the motor. A polarity reversal switch 162 provides this bi-directional control. Current of the desired polarity, say negative for counterclockwise rotation and positive for clockwise rotation of the platform 150, is applied to the motor 116 until the true elevation indicator 131 reads an angle equal to the desired elevation angle. Zero degrees is of course that angle of the elevation axis where the boresight axis 18 of the antenna is in the direction of the local horizon. Since the level axis is rotated relative to elevation, a mislevel is created which is sensed by the elevation level sensor 136 and the elevation rate sensor 140, and their output signals actuate the elevation channel to reduce the mislevel to zero or null condition. Hence, the elevation axis and of course the antenna which rotates in elevation therewith, moves in elevation until the stable platform reaches a null output. Hence, the angle set between the stable platform 150 and the boresight axis 18 is equal to the angle between the boresight axis 18 and the local horizon.

The elevation channel 152, the cross-level channel 154 and the train channel 156 are similar in that they have position loops and rate loops. In the elevation channel 152 for example, the output from the elevation level sensor 136 is applied through a network 164 (for phase and gain compensation), to the summing junction 166 of a position loop amplifier 168. The amplifier 168 is an operational amplifier having feedback through a network 170 which is added to the elevation level sensor output at the summing junction 166. The rate loop is connected within the position loop and is provided by a rate loop amplifier 172. The output from the elevation rate sensor 140 is applied to a summing junction 174 together with feedback from the rate loop amplifier output which is applied to the summing junction 174 by way of feedback network 176. The position loop thus provides outputs in response to long-term motion (viz, position) of the elevation axis, while the rate loop responds to short-term movement (viz, angular motion) about the elevation axis. Under dynamic conditions the position and rate loops operate to sense level and angular motion about the elevation axis whether that motion is pitch, roll, or any vector sum thereof.

The output from the rate loop amplifier controls a servo valve drive amplifier 178 which drives the servo valve 180. The servo provides bi-directional, proportional control of supply and return pressure from the hydraulic power supply 38 to the hydraulic elevation motor 64 so as to rotate the antenna, and of course the level platform 150, to keep the platform level and in the horizontal plane in space. A differential pressure sensor 182 provides feedback to the servo valve drive amplifier 178 for stabilizing the hydraulic servo system provided by the amplifier 178, the valve 180 and the motor 64.

The hydraulic power supply 38 utilizes an electric motor 184 which drives a pump 186. The pump supplies pressurized hydraulic fluid to the elevation motor 64 by way of the servo valve 180. An accumulator 188 is used to smooth the pressure by absorbing any surges. The suction side of the pump 186 is connected to a reservoir 190. The reservoir in turn is connected to the low pressure or return side of the motor by way of the servo valve 180. The hydraulic servos in the cross-level channel 154 and the train channel 156 and the rate and position loops of these channels are not described in detail since they are similar to the corresponding components of the elevation channel which have been described above.

The train channel utilizes position signals from the gyro compass 148. The gyro compass 148 provides a synchro transmitter output which is applied to a control transformer 192. The desired azimuth setting is obtained by rotating the control transformer rotor with respect to its stator to provide an offset corresponding to the desired azimuth angle displacement. The synchro signal is demodulated in a synchro demodulator 194 and applied to the position loop of the train channel 156. The rate loop of the train channel receives signals from the yaw rate sensor. Accordingly, the shorter term periodic yaw motions are decoupled from the antenna by way of the rate loop in the train channel, while the position loop decouples the antenna from long-term changes in the ship's heading.

Figure 5:
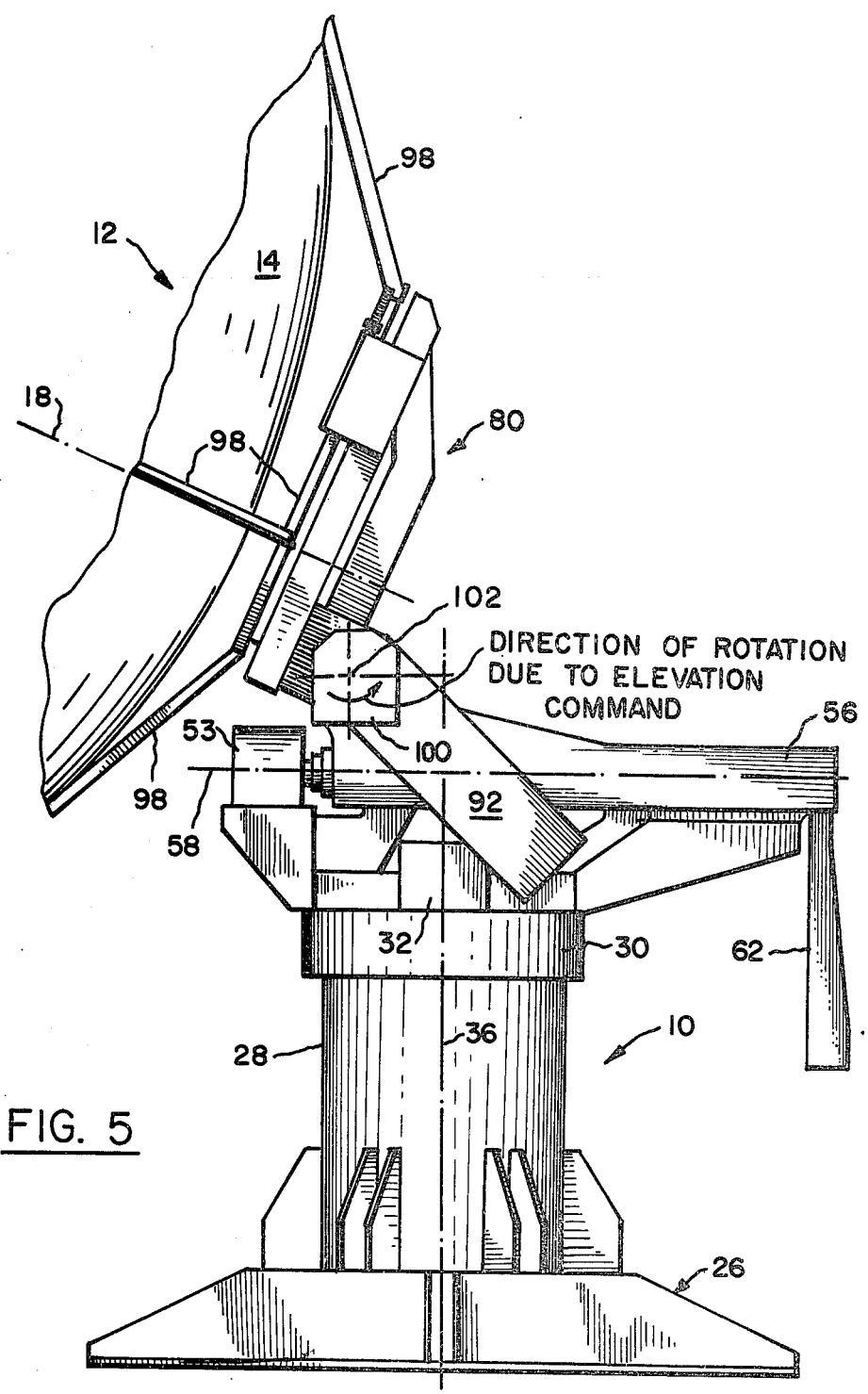
FIG. 5 is a simplified view similar to FIG. 1 which shows the apparatus when a change in elevation of the antenna is effected.

The operation of the apparatus for training the antenna so that its boresight axis 18 points to the satellite, will be apparent from the foregoing description and also from FIG. 5. Consider that the system has been energized and the gyro compass activated and allowed to spin up and align with North. The polarization of the feed 15 may be adjusted for the geographical location of the ship. Once the polarization is adjusted, it is maintained since the boresight axis does not rotate. This is a significant feature of the invention, as mentioned above. The servo controls in the elevation channel 152, cross-level channel 154, and train channel 156 are then actuated by applying power thereto and charging the hydraulic power supply 38. The elevation motor 64 and the cross-level motor 44 then erect the antenna and stabilize the platform. The level platform is then in the horizontal plane.

The elevation and azimuth coordinates of the satellite relative to the ship's position are obtained from a look-up table which is obtained by astronomical calculations based upon the satellite's orbit. The azimuth and elevation angles from the look-up table define the pointing angles of the antenna necessary to acquire the satellite.

Referring to FIG. 5, if a higher elevation angle than that shown were required, the level axis housing 100 would be rotated counter-clockwise (CCW) through the use of the true elevation set control 160. Immediately, a mislevel is created and sensed by the elevation level sensor 136. Its output commands the elevation servo channel 152 to correct for the mislevel via a counter-rotation (CW) of the elevation. That counter-rotation increases the angle between the boresight axis 18 and the local horizon.

This action is smooth and continuous until the desired true elevation is reached and indicated by the true elevation indicator 131. The true elevation set control 160 is then released, and the elevation axis becomes stabilized at the desired true elevation angle.

The desired azimuth angle is then set by the azimuth set control 191 which rotates the control transformer 192. The motor 32 then rotates the antenna about the train axis until the desired azimuth pointing angle, as defined by a null output from the control transformer 192 to the synchro demodulator 194, is reached. The elevation and azimuth pointing angles may be optimized by measuring the signal strength as received by the receiver 24, and trimming the elevation and azimuth controls 160 and 191 to achieve the maximum signal strength. The two-way communication link with the satellite is then established. If the system is equipped with a step track controller 198 (FIG. 6) further operator monitoring is unnecessary unless the satellite orbit degrades or the ship moves to a new geographical location. Without the step track option in use, it is desirable to retrain the antenna periodically, say twice a day.

When a step track controller is 198 is used, a voltage proportional to signal strength (e.g. AGC voltage) in the communications receiver 24 is used as an input. The step-track controller is a beam-peak seeking device that samples signal strength, moves the antenna a small increment, then re-samples and compares the new signal strength to the previous sample. Logic circuits control the direction of the step increments so that the signal strength is continually optimized. In the elevation channel 152, the step tracker commands are routed to an interval timer 200 that controls the speed, direction, and duration of the level axis drive motor 116 such that a change of approximately 0.1° is effected in the true elevation set command. This slight mislevel condition is immediately corrected to level by the elevation channel servo loop 152 as described above.

In the train channel 156, the step-track controller output is in the form of a dc offset command to the position loop summing junction. These offset commands cause stepped deviations in the antennas azimuth pointing angle. The offset commands continue in order that the signal strength be continuously optimized. Accordingly, in the step track mode, the elevation and azimuth pointing angles will hunt back and forth periodically so as to maximize the received signal strength.

From the foregoing description it will be apparent that there has been provided improved apparatus for training a satellite tracking antenna. While in the preferred embodiment hereindescribed, the attitude of the antenna is controlled in elevation by means of rotating the level axis platform 150 relative to the elevation axis, the attitude of the antenna relative to other axes may be controlled by similar means to those hereinabove described. For example, if it is desired to control the attitude of the antenna about the cross-level axis, the level axis platform might be rotatable about an axis parallel to or collinear with the cross-level axis. Moreover, while the apparatus has been described in connection with the training of an antenna it may also be used in training other bodies, elements, or devices, so as to control the attitude thereof and point them in desired directions.

The foregoing and other variations and modifications of the invention will undoubtedly become apparent to those skilled in the art. Accordingly, the foregoing description should be taken merely as illustrative and not in any limiting sense.

What is claimed is:

1. Apparatus for controlling the position of a body which comprises means for mounting said body for rotation about at least two mutually orthogonal axes, means rotatable with said body about said axes defining a platform rotatable with respect to said body about a third axis parallel to or collinear with a first of said two axes, sensor means mounted on said platform for sensing orientation of said body about each of said two axes with respect to the vertical, servo control means responsive to said sensor means for rotating said body about said two axes to maintain said platform level, means for rotating said platform about said third axis to vary the relative angle between said third axis and said first axis, whereby said sensor means operate said servo control means to rotate said body to change the attitude thereof to correspond to said relative angle, means also mounted upon said platform for sensing the angular position of said body about a fourth axis, which is mutually perpendicular to said two axes, relative to a reference position and providing an output corresponding thereto, said servo control means including means responsive to said output for rotating said body about said fourth axis to said reference position, and means for varying said output to maintain said body at other positions relative to said reference position.

2. Apparatus for controlling the position of a body which comprises means for mounting said body for rotation about at least two mutually orthogonal axes, means rotatable with said body about said axes defining a platform rotatable with respect to said body about a third axis parallel to or collinear with a first of said two axes, sensor means mounted on said platform for sensing orientation of said body about each of said two axes with respect to the vertical, servo control means responsive to said sensor means for rotating said body about said two axes to maintain said platform level, means for rotating said platform about said third axis to vary the relative angle between said third axis and said first axis, whereby said sensor means operate said servo control means to rotate said body to change the attitude thereof to correspond to said relative angle, said sensor means including means mounted on said platform responsive to the angular motion of said body with respect to said two axes, means also mounted upon said platform for sensing the angular position of said body about a fourth axis, which is mutually perpendicular to said two axes, with respect to a reference position and providing an output corresponding thereto, means mounted upon said platform for sensing the angular motion of said body about said fourth axis and for providing an output corresponding thereto, said servo control means including means responsive to said outputs from said means for sensing said angular position and motion about said fourth axis to rotate said body to maintain said body at said reference position, and means for varying said output from said angular position sensing means to which said servo control means is responsive to rotate said body about said fourth axis to positions other than said reference position.

3. The invention as set forth in claim 2 wherein said angular position sensing means is a gyro compass.

4. For use on a ship or the like for mounting a directional antenna which is adapted to be trained to point to a satelliteborne transmitting station to maintain communication therewith, said apparatus comprising means mounting said antenna for rotation about a plurality of mutually orthogonal axes, means coupled to said mounting means for rotating said antenna about each of said axes, means for sensing the orientation of said antenna, means defining a platform for mounting said sensing means for movement with said antenna and for rotation about an axis parallel to or collinear with one axis of said plurality of axes, servo control means responsive to said sensing means for operating said rotating means to keep said platform means level, means for rotating said platform means to change the attitude thereof about the axis of rotation of said platform whereby to cause said servo control means to change the attitude of said antenna with respect to said one axis, said antenna being directional along a boresight axis, said plurality of axes includes an elevation axis which is perpendicular to the boresight axis of said antenna and a cross level axis, the axis of said platform being the level axis, said means for rotating said platform means being operative to cause said servo control means to vary the elevation angle of said boresight axis, said mounting means mounting said antenna for rotation about a train axis so that said boresight axis is movable in azimuth, said rotating means including azimuth motor means coupled to said mounting means for rotating said antenna about said train axis, compass means mounted on said platform means for providing an azimuth output corresponding to the relative bearing of said platform means with respect to a reference direction, said servo control means including a train channel for applying said azimuth output to said azimuth motor means for rotating said antenna about said train axis, and means for setting the direction of said antenna in azimuth included in said train channel for varying said azimuth output to correspond to an azimuth setting.

5. The invention as set forth in claim 4 wherein said sensing means includes a rate sensor mounted on said platform means and responsive to the angular motion of said platform about said train axis, said train channel having a position loop responsive to the output from said varying means and a rate loop responsive to the output from said rate sensor, said loops providing said azimuth output for controlling said azimuth motor means.

6. For use on a ship or the like for mounting a directional antenna which is adapted to be trained to point to a satelliteborne transmitting station to maintain communication therewith, said apparatus comprising means mounting said antenna for rotation about a plurality of mutually orthogonal axes, means coupled to said mounting means for rotating said antenna about each of said axes, means for sensing the orientation of said antenna, means defining a platform for mounting said sensing means for movement with said antenna and for rotation about an axis parallel to or collinear with one axis of said plurality of axes, servo control means responsive to said sensing means for operating said rotating means to keep said platform means level, means for rotating said platform means to change the attitude thereof about the axis of rotation of said platform whereby to cause said servo control means to change the attitude of said antenna with respect to said one axis, said antenna being directional along a boresight axis, said plurality of axes includes an elevation axis which is perpendicular to the boresight axis of said antenna and a cross level axis, the axis of said platform being the level axis, said means for rotating said platform means being operative to cause said servo control means to vary the elevation angle of said boresight axis, said level sensor means including a first level sensor responsive to the position of said platform with respect to said elevation axis for providing an elevation position output and a second level sensor responsive to the position of said platform with respect to said cross-level axis for providing a cross level position output, said rotating means including elevation motor means coupled to said mounting means for rotating said antenna about said elevation axis, cross-level motor means coupled to said mounting means for rotating said antenna about said cross-level axis, said servo control means including an elevation channel and a cross-level channel respectively for applying said first level sensor output to said elevation motor means and said second level sensor output to said cross level motor means, said sensor means also including a first rate sensor responsive to angular motion of said platform means about said elevation axis and a second rate sensor responsive to angular motion of said platform means about said cross level axis, said elevation channel including a position loop responsive to said first level sensor and a rate loop responsive to said first rate sensor, said loops in said elevation channel providing a signal for controlling said elevation motor means, said cross-level channel including a position loop responsive to said second level sensor and a rate loop responsive to said second rate sensor, and said loops in said cross level channel providing a signal for controlling said cross level motor means.

7. The invention as set forth in claim 6 wherein said means for rotating said platform means includes a level motor means mounted to drive said platform means about said level axis, means for setting the elevation angle of said antenna bore sight axis providing a control signal for operating said motor to rotate said platform means in a sense opposite to the sense in which said elevation angle is to be varied to reach said elevation setting.

8. The invention as set forth in claim 7 including means responsive to signals received from said satellite by said antenna for successively providing step track signals representing the strength of said received signal, and means included in said elevation angle setting means responsive to said step track signals for changing said control signals in the sense to change said elevation angle whereby to increase the strength of said received signals.

9. The invention as set forth in claim 8 and wherein said mounting means also mounts said antenna for rotation about a train axis so that said boresight axis is movable in azimuth, said rotating means including motor means coupled to said mounting means for rotating said antenna about said train axis, compass means mounted on said platform means for providing an azimuth output corresponding to the relative bearing of said platform means with respect to a reference direction, said servo control means including a train channel for applying said azimuth output to said motor means for rotating said antenna about said train axis, and means for setting the direction of said antenna in azimuth included in said train channel for varying said azimuth output to correspond to an azimuth setting, and means included in said azimuth direction setting means responsive to said step track signals for varying said azimuth output to change the position of said antenna in azimuth whereby to increase the strength of said received signals.

10. For use on a ship or the like, apparatus for mounting a directional antenna having a boresight axis which is adapted to be trained towards a satellite-borne transmitting station to maintain communication therewith, said apparatus comprising a pedestal adapted to be secured to the structure of said ship, a section journaled on the pedestal for rotation about a train axis perpendicular to the deck of said ship, a yoke rotatably mounted on said section for rotation about a cross-level axis, a support structure in which said antenna is held, said support structure being mounted on said yoke for rotation about an elevation axis, said elevation axis, cross elevation and train axes being mutually orthogonal, said elevation axis also being orthogonal to said boresight axis, a unit mounted on said support structure for rotation about a level axis which extends in the same direction as said elevation axis and in mutually orthogonal relationship with said cross-level and train axes, separate train, cross-level elevation and level motors respectively in rotational driving relationship with said section, said yoke and said support structure, an elevation level sensor, a cross level sensor, and an azimuth sensor mounted in said unit, said unit defining a level platform for said sensors, said sensors providing a separate elevation, cross level and azimuth outputs corresponding to the angular position of said platform with respect to said elevation and cross-level axes and with respect to a reference azimuthal direction, an elevation channel and a cross level channel respectively responsive to said elevation sensor output and said cross level sensor output for controlling said elevation and cross level motors to rotate said support structure and said yoke to maintain said platform level, means for setting the elevation angle of said boresight axis operative to control said level motor to rotate said level platform to an angle equal and opposite to said elevation angle whereby to cause said elevation sensor to provide an elevation output to said elevation channel to cause said elevation motor to rotate said support structure until said bore sight axis reaches said elevation angle, and a train channel responsive to said azimuth sensor output and to a control signal corresponding to the direction azimuth of said boresight axis for controlling said azimuth motor to rotate said section until it reaches said azimuth direction.

11. The invention as set forth in claim 10 wherein said support structure has a framework having a base, said antenna being disposed in said framework upon said base on one side thereof, a plurality of blocks extending from the opposite side of said base, a shaft held in said blocks, said yoke having bearings in which said shaft is journaled, the axis of said shafts being collinear with said elevation axis, said elevation motor being disposed on said yoke and being coupled to said shaft.

12. The invention as set forth in claim 11 wherein said section has upwardly extending arms, said yoke has a shaft attached thereto, bearings disposed on said arms in which said yoke shaft is mounted, said cross level motor being disposed on one of said arms and being coupled to said yoke shaft, said yoke shaft being disposed below said elevation shaft and said yoke shaft being collinear with said cross level axis.

13. The invention as set forth in claim 12 wherein said train motor is mounted on said section with the axis of said motor parallel to said train axis and coupled in driving engagement with said pedestal.

14. The invention as set forth in claim 10 wherein said unit comprises a housing, a shaft on said support structure, said shaft being disposed along said elevation axis, bearings rotatably mounting said housing on said shaft, said level motor being disposed in said housing and having a shaft disposed along an axis parallel to and spaced from said elevation axis shafts, a ring gear secured to said support structure gearing means including a pinion connected to said level motor shaft, said pinion being in engagement with said ring gear whereby to rotate said housing about said level axis.

15. The invention as set forth in claim 14 wherein said azimuth sensor is a gyro compass which is disposed in said housing.

16. The invention as set forth in claim 15 wherein said apparatus further comprises an elevation rate sensor, a cross elevation rate sensor, and a yaw rate sensor, all mounted in said housing, said elevation, cross level and train channels each having a position loop amplifier and a rate loop amplifier, means for applying the level sensor output to said position loop amplifier inputs, means for applying said position loop amplifier output and said rate sensor output to the input of said rate loop amplifier, and means for controlling said motors in accordance with the output of said rate loop amplifier.

17. The invention as set forth in claim 16 wherein said apparatus includes step track controller means responsive to a signal received from said satellite by said antenna for providing step track control signals, and means for applying said step track control signals to the position loop amplifier of said train channel and to said level motor so as to vary said level control signal and said azimuth sensor signal to cause said antenna to rotate in azimuth and elevation in a direction to increase the strength of said received signal.

* * * * *